(12) United States Patent
Cesak et al.

(10) Patent No.: US 8,950,432 B2
(45) Date of Patent: Feb. 10, 2015

(54) HOLLOW VALVE PLATE

(71) Applicants: Roland Cesak, Schwabbruck (DE); Olaf Bielmeier, München (DE)

(72) Inventors: Roland Cesak, Schwabbruck (DE); Olaf Bielmeier, München (DE)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 0 days.

(21) Appl. No.: 14/022,432

(22) Filed: Sep. 10, 2013

(65) Prior Publication Data
US 2014/0076443 A1    Mar. 20, 2014

(30) Foreign Application Priority Data

Sep. 14, 2012 (AT) .............................. A 50392/2012

(51) Int. Cl.
| | | |
|---|---|---|
| *F16K 15/14* | (2006.01) | |
| *F04B 39/06* | (2006.01) | |
| *F04B 39/10* | (2006.01) | |
| *F04B 39/12* | (2006.01) | |

(52) U.S. Cl.
CPC .................. *F16K 15/14* (2013.01); *F04B 39/06* (2013.01); *F04B 39/1066* (2013.01); *F04B 39/123* (2013.01); *F04B 39/1073* (2013.01)
USPC ....................... 137/855; 137/512.15; 417/571

(58) Field of Classification Search
USPC ................. 137/855, 512.15, 338, 339, 512.4; 417/571
See application file for complete search history.

(56) References Cited

U.S. PATENT DOCUMENTS

| | | |
|---|---|---|
| 3,375,972 A | 4/1968 | Raufeisen |
| 5,980,219 A | 11/1999 | Spurny |
| 2013/0087233 A1 | 4/2013 | Cesak et al. |

FOREIGN PATENT DOCUMENTS

WO    WO 2011124502 A1 * 10/2011

OTHER PUBLICATIONS

Translation of WO2011124502.*

* cited by examiner

*Primary Examiner* — Kevin Lee
*Assistant Examiner* — P. Macade Nichols
(74) *Attorney, Agent, or Firm* — Dykema Gossett PLLC

(57) ABSTRACT

The hollow valve plate (1) of a piston compressor includes a single half-shell (3) with cooling channels (4, 5) that are open toward the side of the pressure valves (8), with said half-shell being covered by a reed plate 2 that is preferably welded or glued at least along the cooling channels (4, 5), and that is formed as a lift-stop (9) for the inserted closing plates (10) in the area or the pressure valves (8). This results in a simplification of the production and assembly of such valve plates.

6 Claims, 2 Drawing Sheets

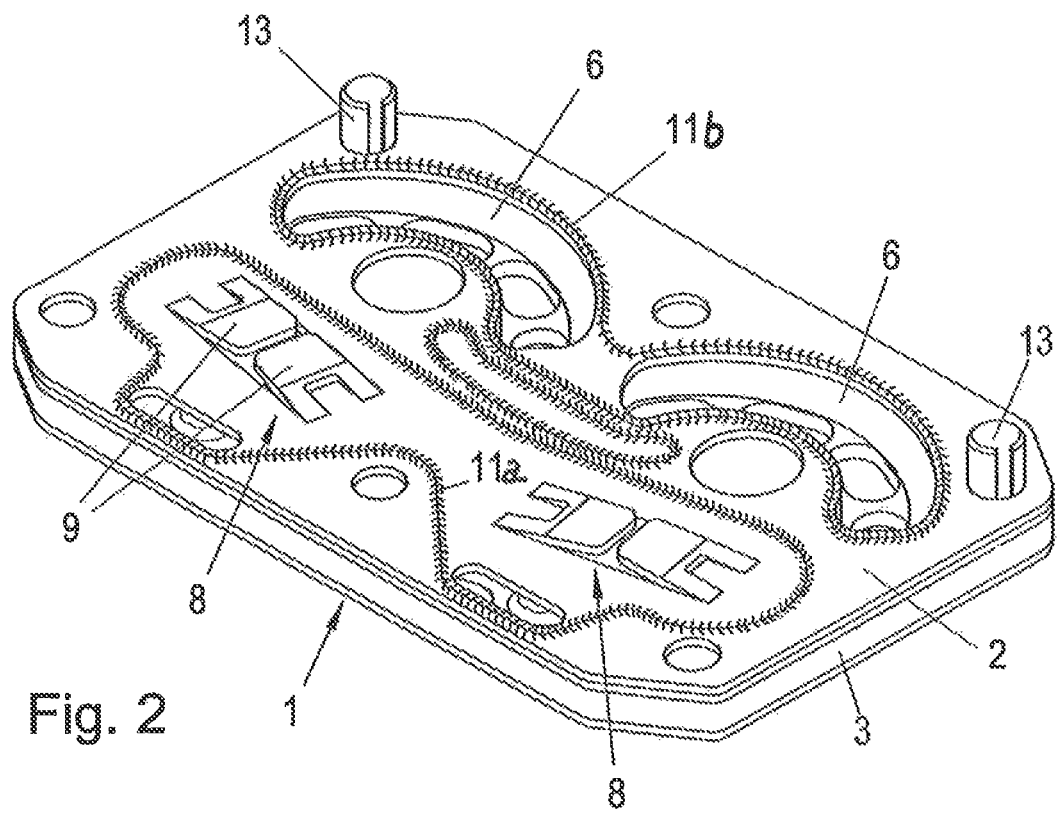
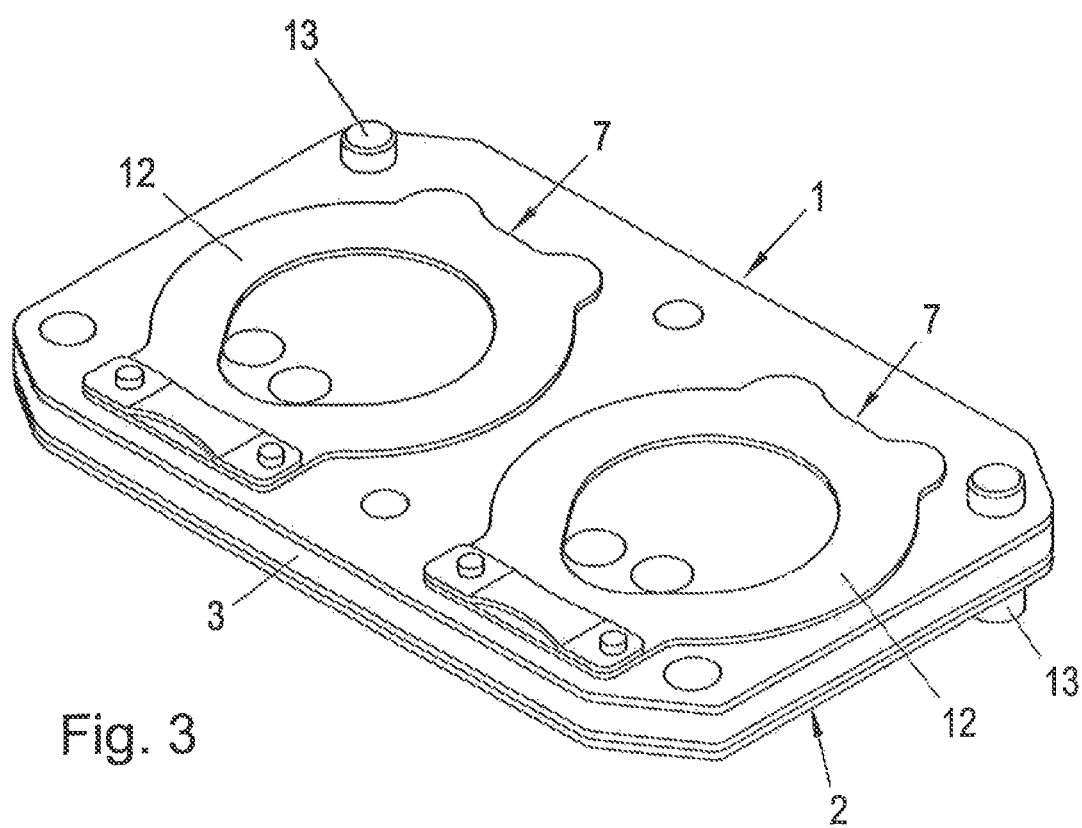

HOLLOW VALVE PLATE

BACKGROUND OF THE INVENTION

1. Field of the Invention

The invention relates to a hollow valve plate for liquid-cooled valves of a piston compressor having a half shell with cooling channels that are open on one side and that are covered up by a thin reed plate, which is sealed at least along the cooling channels, and includes elements of the valves that are machined from said plate and connected in one piece on one side.

2. The Prior Art

Especially when used as a brake air compressor in motor vehicles or the like running frequently for long periods of time at high power, it is necessary to actively cool the valve plate carrying at least one suction valve and one pressure valve to prevent overheating in this area and to pre-cool, at least to a certain degree, the compressed air that is expelled via the pressure valves, before the air is then, in most cases, further cooled inside the cylinder head area prior to being discharged. According to the prior art, for this purpose, valve plates are used that are hollow in some areas and/or provided with cooling channels, and the cooling chambers and/or cooling channels of which are connected to a liquid cooling system of the piston compressor, and/or connected together with the same to the liquid cooling of an internal combustion engine used for powering a motor vehicle.

The current prior art for producing such hollow valve plates usually envisions brazing. The individual parts to be brazed therein are a number of thin-stamped steel plates which are connected in packets so as to form one unit, wherein from meander-shaped cutouts and recesses in some areas of the middle plates together with the outer plates, which are closed except for inflow and outflow openings, cooling channels or cooling chambers are created. However, there are also embodiments having two half-shells (mostly made of grey cast iron), which comprise channels or areas that are open on one side and which, when being assembled, form closed three-dimensional channels and/or chambers on the inside. Both embodied variants provide, in most cases, that suction fins or pressure fins are finally fastened via a receptacle or the like on the valve plate.

Aside from the fact that the known valve plates therefore comprise a relatively high number of individual parts and are also quite complicated in terms of production and assembly, they also suffer from the disadvantage that the clearance created on the cylinder side, meaning the design-related dead space that cannot be compressed any further, is quite large, which has a negative influence on the volumetric efficiency of the compressor.

Furthermore, WO2011/124502A1 discloses a hollow valve plate of the type as described in the introduction that provides for a reed plate, which is, for example, known from DE1628187A1 or EP 846227A1, that covers the totality of the valve plate and is clamped to the same between cylinder and cylinder head, and that serves, simultaneously, for closing, on the cylinder side, the cooling channels, which are open on the cylinder side. By omitting the separate second half-shell and/or reed plate on the cylinder side, which formed and/or closed until now these channels on the cooled valve plates, not only was it possible to achieve a considerable simplification in terms of production and assembly of such hollow valve plates, but also a substantial reduction of the clearance on the cylinder side. In addition, sealing of the total system was simplified, because one sealing level is omitted. The associated savings resulting from less weight and reduced costs were also advantageous.

Therefore, it is the object of the present invention to improve a hollow valve plate of the kind as described in the introduction in such a manner that the achieved advantages can be maintained unchanged also independently of the concrete configuration of the suction side of the valve plate, and thereby for a larger number of different configurations of piston compressors.

SUMMARY OF THE INVENTION

According to the invention, this object is achieved by providing that the half-shell includes open cooling and/or media channels toward the side of the pressure valves, which are covered and sealed by the reed plate that includes, machined and connected on one side, the lift stops of the inserted closing plates of the pressure valves. Correspondingly, the reed plate is used for covering the channels that are open toward the pressure side as well as, simultaneously, for assuming a partial function of the pressure valves. This is presently not the closing function of these valves themselves but, advantageously, the function of the lift stops, such that after the assembly of the hollow valve plate, wherein the closing plates of the pressure valves are inserted and covered up by the reed plate with the lilt stops that is disposed there-above, there results a closed assembly unit that does not require any further retaining elements for the pressure valves, which results in a great simplification for storage and assembly.

In a preferred embodiment of the invention, the reed plate is connected to the semi-shell at least along the channels and, preferably, also around the outflow openings of the valves, preferably welded or glued, thereby ensuring a reliable connection of the reed plate with the half-shell and simultaneous sealing action only of the necessary regions. If further passage openings that are provided in the reed plate and/or the half-shell must be sealed as well, this can be easily accomplished by extending the welding and/or gluing action to include these regions.

According to a particularly preferred improvement of the invention, the valve plate includes a further reed plate on the suction side thereof, which includes in the region of the suction openings a suction fin that is, respectively, machined from the reed plate and connected in one piece on one sloe and that seals, preferably by welding or gluing, any cooling and/or media channels that may be present on this side. There results, correspondingly, an extremely advantageous combination of the present invention with the prior art that was addressed in the introduction and that allows for a great variety of design options for such valve plates.

BRIEF DESCRIPTION OF THE DRAWINGS

The invention will be illustrated in further detail below based on the embodiment that is schematically depicted in the drawings.

FIG. 2 shows the same valve plate in the assembled state from the pressure side (in FIG. 1 from the top); and FIG. 3 shows the valve plate from the suction side (in FIG. 1 from the bottom).

DETAILED DESCRIPTION OF THE DEPICTED EMBODIMENT

Figure 1:
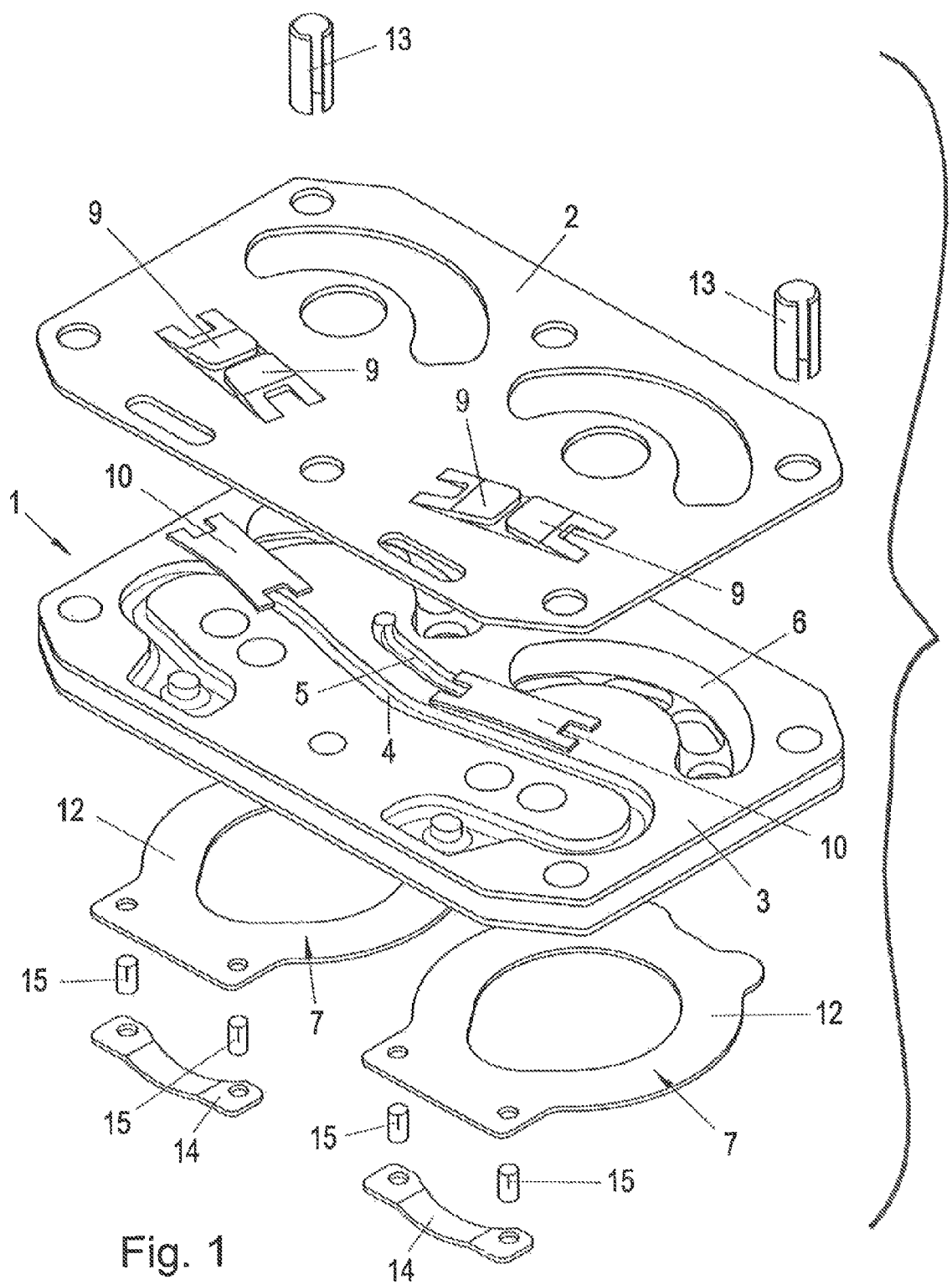
FIG. 1 shows an exploded view of a valve plate according to the invention with any essential details.

All figures only depict the valve plate 1 itself—the cylinder block of a two-cylinder piston compressor, which has been omitted for better clarity of the representation, is connected according to FIGS. 1 and 2 at the bottom of the valve plate. Located above the same in these figures is an imagined cylinder head that includes suction and pressure channels with the corresponding connections, cooling channels, and the like.

The half-shell 3 that includes, according to Figs. 1 and 2, cooling channels 4, 5 (and/or media channels that are not shown in further detail, for example, for control air, and the like) only on the pressure side (top), is covered up by a reed plate 2 that is sealed at least along the cooling channels 4, 5 (as we as around the net openings 6 of the suction valves 7), includes, in the area of the pressure valves 8, machined, connected on one side, lift stops 9 for the inserted closing pates 10 of the pressure valves 8 (Fig. 1), According to Fig. 2, the reed pate 2 is permanently connected to the half-shell 3 not only along the cooling channels 4, 5 and the pressure valve 8 (for example, by the indicated weld bead 11a or a corresponding glued connection), but also in the area of the inlet openings 6 (by weld bead 11b) to the suction valves 7, which are controlled, according to Fig. 3, on the bottom side of the valve plate by separately fastened suction fins 12. Aside from this, it is also possible to dispose a further continuous reed plate on the suction side that includes, in the area of the suction openings, a suction fin machined, respectively, from this further reed plate and connected in one piece on one side, whereby (similarly as on the pressure side) any further cooling and or media channels that may be present on this side can be covered in a sealing manner.

The depicted valve plate 1 is composed only of four parts on the pressure side half-shell 3, reed plate 2 with the lift-stops 9 formed thereon, and the inserted two closing plates 10 of the pressure valves. The result are fewer components, which is associated with less production and assembly complexity, lower weight and reduced cost. A further improvement could be achieved, as indicated, by the use of a further reed plate with integrated suction fins.

Reference is presently being made to the adjustment sleeves 13 for the correct placement of the valve plate 1 between the cylinder and cylinder head, as well as fastening elements 14, 15 for the suction fins 12 of the suction valves 7 of the valve plate 1 only purposes of comprehensiveness.

The invention claimed is:

1. A hollow plate valve for a piston compressor, said plate valve comprising:
   a half shell which has opposite first and second surfaces, and which defines an inlet opening there through and cooling channels therein which open to said first surface,
   a suction fin attached to said second surface of said half shell for opening and closing said inlet opening,
   a reed plate positioned adjacent said first surface of said half shell and attached to said first surface by connection means which surrounds said cooling channels, said reed plate defining lift stops therein, and
   closing plates located between said lift stops and said half shell.

2. The hollow plate valve according to claim 1, wherein said connection means comprises an endless weld.

3. The hollow plate valve according to claim 1, wherein said connection means comprises an endless strip of glue.

4. The hollow plate valve according to claim 1, wherein said connection means surrounds said inlet opening.

5. The hollow plate valve according to claim 1, wherein said half shell defines a plurality of inlet openings, and including a plurality of suction fins for opening and closing respective inlet openings.

6. The valve plate according to Claim 1, include a further reed plate positioned adjacent said second surface of said half shell, said further reed plate including in an area of the suction openings, respectively, a suction fin that is machined from the further reed plate, in one piece on one side, and that can seal any cooling and/or media channels present on this side, by means of a welded or glued connection.

* * * * *